United States Patent
Matsumora

[11] Patent Number: 5,998,791
[45] Date of Patent: Dec. 7, 1999

[54] THERMALLY SENSITIVE ELEMENT AND RADIATION SENSOR

[75] Inventor: Satoru Matsumora, Miyagi-ken, Japan

[73] Assignee: Alps Electric Co., Ltd., Tokyo, Japan

[21] Appl. No.: 08/909,493

[22] Filed: Aug. 12, 1997

[30] Foreign Application Priority Data

Aug. 23, 1996 [JP] Japan .................................. 8-222869

[51] Int. Cl.$^6$ ........................................................ G01J 5/22
[52] U.S. Cl. ............................ 250/338.1; 338/18; 338/25
[58] Field of Search ........................... 250/338.1; 338/18, 338/25

[56] References Cited

U.S. PATENT DOCUMENTS 5,298,749  3/1994  Inushima .............................. 250/338.4
5,742,052  4/1998  Noguchi et al. ...................... 250/338.1

FOREIGN PATENT DOCUMENTS 1-57131  3/1989  Japan .
3-96824  4/1991  Japan .

Primary Examiner—Constantine Hannaher
Attorney, Agent, or Firm—Brinks Hofer Gilson & Lione

[57] ABSTRACT

A thermally sensitive element is manufactured as follows: a carbonized sheet material is prepared by carbonizing an aramid film at a low temperature; a conductive layer made of carbon ink is formed on the surface of the carbonized sheet material; and a pair of extraction electrodes made of a thin metallic film are provided on the reverse surface of the carbonized sheet material. For applying the thermally sensitive element to a radiation sensor, the conductive layer is arranged to receive radiant rays from the outside, and terminals are connected to the extraction electrodes.

10 Claims, 9 Drawing Sheets

FIG. II
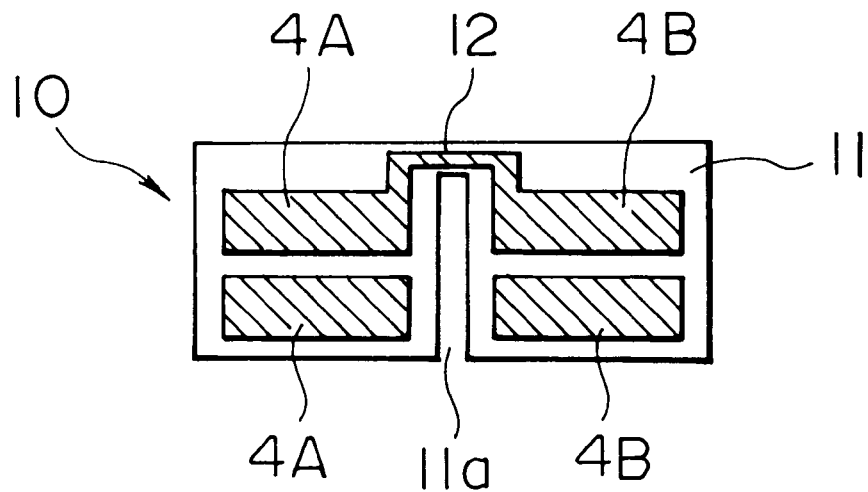
FIG. 12
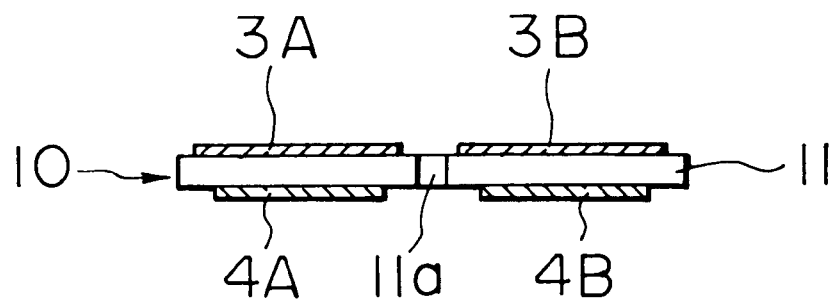

THERMALLY SENSITIVE ELEMENT AND RADIATION SENSOR

BACKGROUND OF THE INVENTION

1. Field of the Invention

The present invention relates to a thermally sensitive element whose resistance alters due to changes in the ambient temperature or infrared radiation, and a radiation sensor employing such a thermally sensitive element.

2. Description of the Related Art

Conventionally, temperature sensors employing a thermally sensitive element have been known in which said thermally sensitive element is prepared by carbonizing an organic material such as a phenol resin at 640 to 750° C., as is described in Japanese Patent Laid-Open No. 8-166295. Such temperature sensors detect the changes in resistance, in practice, changes in voltage, from electrodes formed at both ends of the thermally sensitive element based on the fact that the resistance of the thermally sensitive element alters according to the ambient-temperature change.

In addition, a thermally sensitive element composed of a fiber filament essentially consisting of silicon carbide and the like is known to detect infrared rays as a resistance change caused by the temperature change due to absorption of the infrared rays, as is described in Japanese Patent Laid-Open No. 3-96824. For assembling an infrared sensor employing such a thermally sensitive element, two of the four thermally sensitive elements are used for sensing radiation and the other two thermally sensitive elements are employed for temperature compensation, and they are alternately connected in series to form a bridge circuit. Changes in resistance of the thermally sensitive elements due to the ambient temperature can be thereby canceled so that changes in resistance due to only infrared absorption can be detected.

Carbonized materials treated at a low temperature exhibit semiconductor-like conductivity such that the temperature dependency (thermistor constant) increases according to a rise in the specific resistance and decreases according to a reduction in the specific resistance. Meanwhile, for employing such carbonized materials for a thermally sensitive element of a temperature sensor or a radiation sensor, the operating resistance of the thermally sensitive element is preferably low, considering the detecting circuit and level of noise in the sensor. However, in the thermally sensitive element used for the above-mentioned conventional temperature sensors, electrodes are formed on both ends of a sheet of a carbonized material treated at a low temperature so as to detect the resistance along the longitudinal direction of the carbonized sheet material positioned between the electrodes. Thus, to set the operating resistance between the electrodes in a general range, i. e., from several kΩ to several hundreds kΩ, carbonized materials having high specific resistance cannot be used. Therefore, the temperature dependency of the thermally sensitive element is lowered, thereby disadvantageously reducing the sensor sensitivity.

Although the above thermally sensitive element can be also applied to radiation sensors such as infrared sensors, in such a case it is necessary to have either surface of the thermally sensitive element as a radiation sensitive face receiving radiant rays coming from the outside. However, since the above conventional thermally sensitive elements have their electrodes at both ends thereof, it is impossible to entirely use one surface of the thermally sensitive element as the radiation sensitive face. Thus the whole size of the thermally sensitive elements must be enlarged to ensure the required area of the radiation sensitive face. Therefore, disadvantageously, the heat capacitance of the thermally sensitive elements increases and the response rate of the resulting radiation sensors is lowered.

In a radiation sensor, such as an infrared sensor, employing a thermally sensitive element composed of a fiber filament, when a bridge circuit of the radiation sensor consists of four thermally sensitive elements, these four elements must have the same temperature dependency, which requirement is difficult from a manufacturing aspect. Moreover, electrodes must be fixed to both ends of each fiber filament by a conductive adhesive or the like, thus the assembling procedure is complicated, resulting in high cost.

SUMMARY OF THE INVENTION

According to the present invention, a thermally sensitive element is made of a carbonized material having a high specific resistance. A plurality of extraction electrodes are provided on one surface of a carbonized sheet material, and a conductive layer is formed on the reverse surface. Since the resistance between the extraction electrodes of such a thermally sensitive element is almost the same as twice of the thickness-direction resistance of the carbonized sheet material, the operating resistance can be set in a range of from several kΩ to several hundreds kΩ, i. e., a generally used range. In other words, a thermally sensitive element having a high temperature dependency can be achieved, despite the use of a carbonized sheet material having a high specific resistance. Furthermore, in a radiation sensor having such a thermally sensitive element, the portion having the conductive layer can be used as a radiation sensitive face. Since no extraction electrode is formed on this radiation sensitive face, the heat capacitance of the thermally sensitive element can be lowered, thereby advantageously raising the response rate.

In a thermally sensitive element of the present invention, a plurality of extraction electrodes are formed on one surface of a carbonized sheet material prepared by carbonizing an organic material, and a conductive layer having a specific resistance lower than that of the carbonized sheet material is formed on almost the entire reverse surface. Preferably, the carbonized sheet material has a specific resistance of 1 Ω·cm to 100 MΩ·cm and a thermistor constant of 100 to 3,500 K at normal temperature. This is because when the thermistor constant is less than 100 K, output with respect to changes in temperature becomes excessively low, thus the carbonized sheet material cannot readily be used for a temperature sensor or a radiation sensor; meanwhile, the thermistor constant of more than 3,500 K makes the specific resistance overly high, thus it becomes difficult to use the carbonized sheet material in a general range of the operating resistance.

Although various organic materials such as polyimide and polyethylene terephthalate can be used as a raw material of the carbonized sheet material, aramid films are particularly preferable. This is because the dimensional reduction rate of aramid films in the thickness direction perpendicular to the alignment of the crystals is increased more by carbonization as compared with other materials, and thus the distance between the extraction electrodes and the conductive layer can be decreased to the order of $\mu$m.

A radiation sensor of the present invention is provided with the above thermally sensitive element having the conductive layer receiving radiant rays coming from the outside. In such a case, the conductive layer must be made of a material having a high heat-absorbing efficiency. In particular, a conductive material containing carbon is preferably used.

Moreover, a radiation sensor of the present invention has at least two thermally sensitive elements whose extraction electrodes are serially connected. One of the thermally sensitive elements is used for sensing radiation and the other is employed for temperature compensation. According to a radiation sensor having the above structure, it becomes easier to match the temperature dependency of the thermally sensitive element for sensing radiation and that of the thermally sensitive element for temperature compensation. Thus, when radiant rays coming from the outside are allowed to reach only the conductive layer of the thermally sensitive element for sensing radiation, changes in resistance due to the ambient temperature can be canceled by the thermally sensitive element for temperature compensation.

In addition, a radiation sensor of the present invention comprises the thermally sensitive element in which the carbonized sheet material is composed of a base film. The base film has a conductive layer for sensing radiation and another conductive layer for compensating for the temperature. Extraction electrodes opposite to these conductive layers are serially connected. According to the radiation sensor having the above structure, the thermally sensitive element for sensing radiation and the thermally sensitive element for temperature compensation are formed on one base film, and thus the selection procedure for matching the temperature dependencies of these thermally sensitive elements are not required, resulting in an improved efficiency of the procedure. In addition, the extraction electrode of the thermally sensitive element for sensing radiation and that of the thermally sensitive element for temperature compensation can be connected by a wiring pattern on the base film. Thus, efficiency of the procedure can be further improved.

Furthermore, when a cut-out section is formed in the base film and the radiation-sensing conductive layer and the temperature-compensating conductive layer are formed adjacent to each other in a plurality of regions divided by the cut-out section, the radiant heat absorbed in the radiation-sensing conductive layer is outgoingly radiated from the cut-out section. Temperature elevation due to heat conduction to thermally sensitive element for temperature compensation can be thereby suppressed.

Moreover, in a radiation sensor employing the thermally sensitive element for sensing radiation and thermally sensitive element for temperature compensation, when a window made of a material passing radiant rays is formed in a lid made of a material not passing radiant rays, only the radiation-sensing conductive layer is allowed to receive radiant rays coming from the outside through the window, and the radiant rays do not reach the temperature-compensating conductive layer. Even when the above structure is not employed and the radiant rays from the outside are radiated on both radiation-sensing conductive layer and the temperature-compensating conductive layer, temperature elevation of thermally sensitive element for temperature compensation can be also suppressed by using the above-mentioned carbon-containing conductive material for the radiation-sensing conductive layer and employing a metallic thin-film, such as aluminum, silver, or chromium, having significantly higher infrared reflectance than that of carbon as the temperature-compensating conductive layer.

BRIEF DESCRIPTION OF THE DRAWINGS

FIG. 11 shows the reverse side of a thermally sensitive element used in the radiation sensor shown in FIG. 10;

FIG. 12 is a front view of the thermally sensitive element shown in FIG. 11;

DESCRIPTION OF THE PREFERRED EMBODIMENTS

Embodiments of the present invention will be described below with reference to the drawings.

Figure 1:
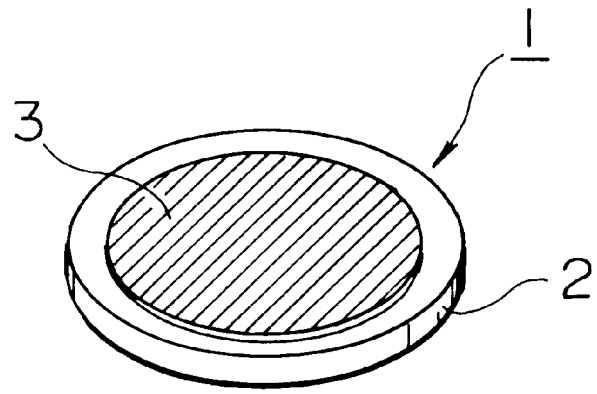
FIG. 1 is a perspective view showing the top side of a thermally sensitive element of an embodiment.
Figure 2:
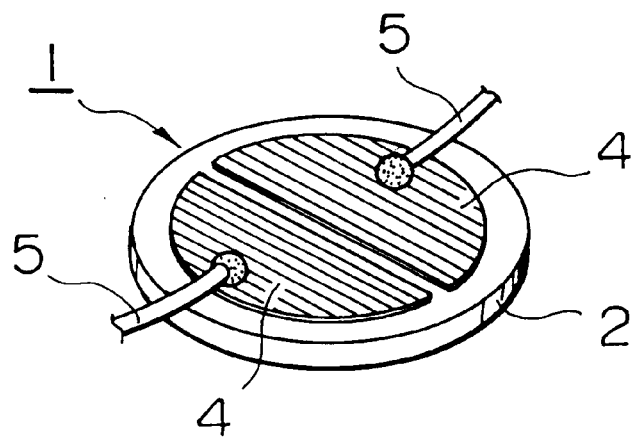
FIG. 2 is a perspective view showing the reverse side of the thermally sensitive element shown in FIG. 1.
Figure 3:
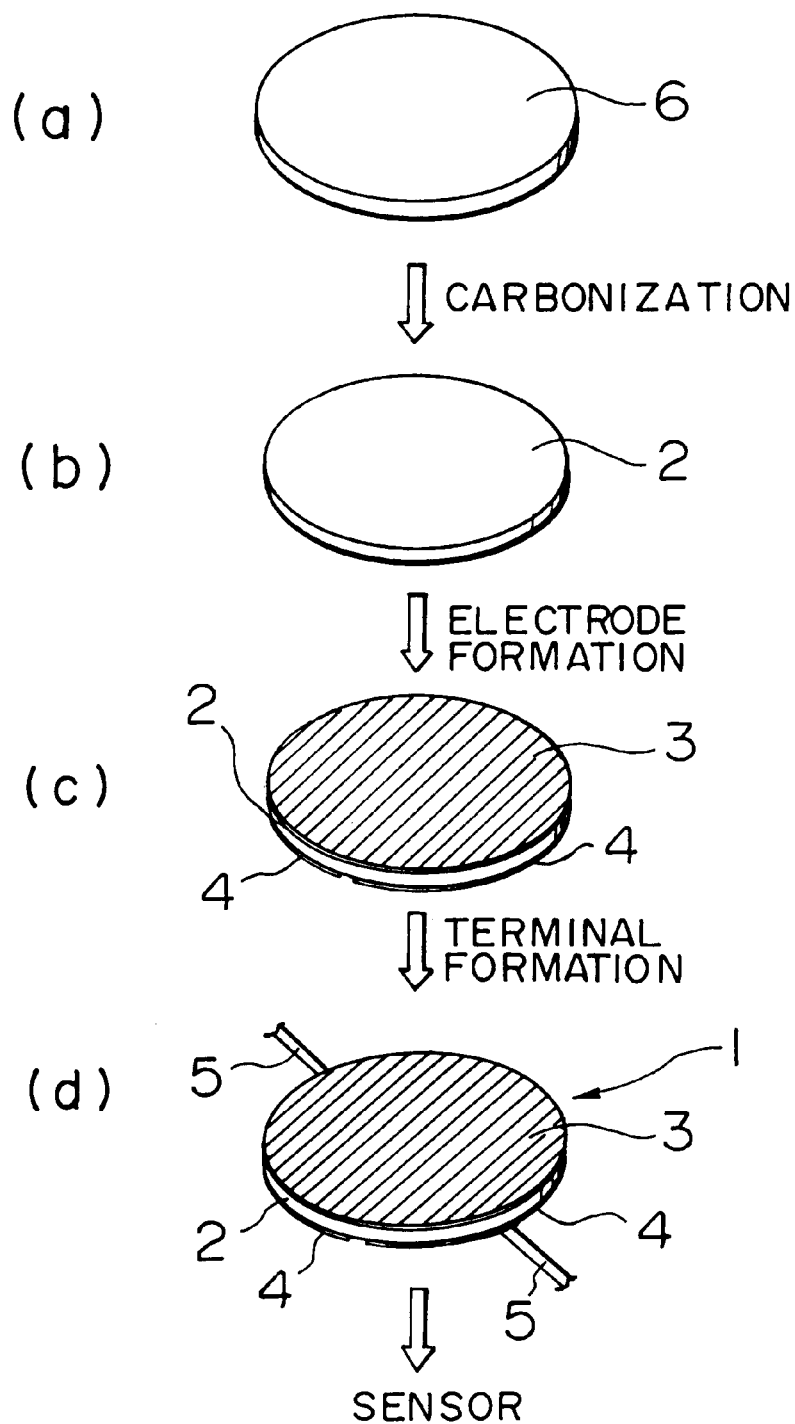
FIG. 3, including parts (a) to (d), is a flow diagram showing a process for manufacturing the thermally sensitive element of FIG. 1.
Figure 4:
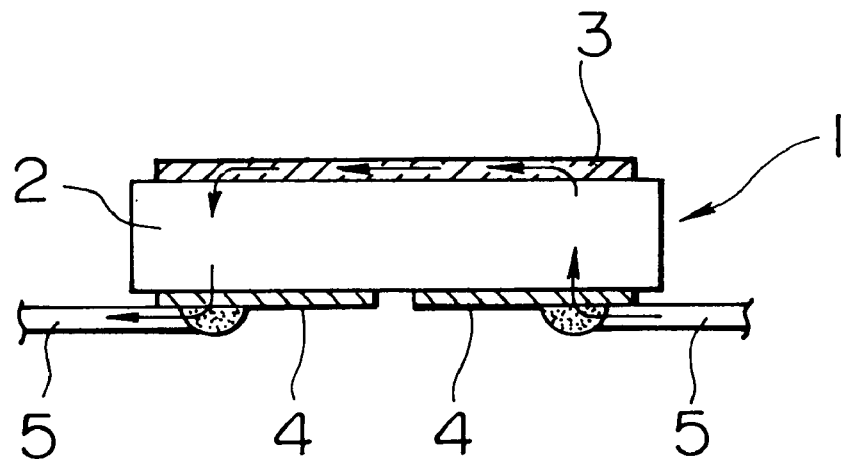
FIG. 4 is a sectional view of the thermally sensitive element of FIG. 1.
Figure 5:
FIG. 5 shows an equivalent circuit of the thermally sensitive element of FIG. 1.

FIG. 1 is a perspective view showing the top side of a thermally sensitive element of an embodiment, FIG. 2 is a perspective view showing the reverse side of the thermally sensitive element, FIGS. 3(a) to 3(d) are flow diagrams showing a process for manufacturing the thermally sensitive element, FIG. 4 is a sectional view of the thermally sensitive element, and FIG. 5 shows an equivalent circuit of the thermally sensitive element.

A thermally sensitive element 1 has a disk 2 made of a carbonized material, and a conductive layer 3 formed on almost the entire surface of the disk 2, as is shown in FIGS. 1 and 2. The disk 2 has a specific resistance of 1 $\Omega\cdot$cm to 100 M$\Omega\cdot$m and a thermistor constant of 100 to 3,500 K at normal temperature. When the thermistor constant B is converted to the activation energy $\Delta$E, it is indicated as B=5,794×$\Delta$E, and thus the activation energy $\Delta$E≈0.017 to 0.6 eV. Any material can be used for the conductive layer 3, so long as its specific resistance is sufficiently lower than that of the disk 2. For example, the following materials having a specific resistance of $10^{-6}$ to $10^3$ $\Omega\cdot$cm can be used: a thin film of gold, silver, copper, nickel, or aluminum; and a thick film of carbon ink, silver ink, or copper ink. A pair of extraction electrodes 4 are formed at a predetermined interval on the reverse surface of the disk 2, and terminals 5 are connected to the corresponding extraction electrodes 4. Therefore, the terminals 5 can be connected to the extraction electrodes 4 at higher efficiency as compared with a case in which extraction electrodes are formed on both surfaces of the disk 2. On the reverse surface of the disk 2, the extraction electrodes 4 may be formed from the above-mentioned materials employed for the conductive layer 3, followed by connecting the terminals 5 to the extraction electrodes 4 with solder or a conductive adhesive. The conductive adhesive per se may be used as the extraction electrodes 4, and in such a case, each of the terminals 5 is directly fixed to the reverse surface of the disk 2 using the conductive adhesive (the extraction electrodes 4).

A method for manufacturing the thermally sensitive element 1 will be described with reference to FIGS. 3(*a*) to 3(*d*). A para-aramid film 6 (base film) cut in a disk-shape is prepared, as is shown in FIG. 3(*a*). For example, the aramid film 6 has a diameter of 6 mm and a thickness of 50 $\mu$m. To obtain the disk 2 having a semiconductor-like conductivity, the aramid film 6 is carbonized under an atmosphere of an inert-gas such as $H_2$, $N_2$, or Ar at 600 to 750° C., at which temperature grafitization of the aramid film 6 does not proceed. The aramid film 6 of the above-mentioned size shrinks due to the carbonization, and the resulting disk 2 has a diameter of 5 mm and a thickness of approximately 36 $\mu$m. The conductive layer 3 is then formed on almost the entire surface of the disk 2 and the pair of extraction electrodes 4 are provided on the reverse surface of the disk 2 at an interval of 0.1 mm or more, as is shown in FIG. 3(*c*). Finally, as is shown in FIG. 3(*d*), the terminals 5 are fixed to the corresponding extraction electrodes 4 on the reverse surface of the disk 2 to complete the thermally sensitive element 1.

According to the thermally sensitive element 1 having the above structure, the specific resistance of the disk 2 is higher than that of the conductive layer 3, and the thickness of the disk 2 is smaller than the distance between the pair of extraction electrodes 4. Thus, the electric current flows in the thickness direction of the disk 2 from one extraction electrode 4, passes through the conductive layer 3, and reaches the other extraction electrode 4, as is shown in FIGS. 4 and 5. As a result, the resistance between the terminals 5 becomes almost the same as twice of the thickness-direction resistance of the disk 2. Despite the use of the thermally sensitive element 1 having a high specific resistance, the operating resistance can be set in a general range, i. e., from several k$\Omega$ to several hundreds k$\Omega$, because of the following reasons: the distance between the conductive layer 3 and the extraction electrodes 4 is determined by the thickness of the disk 2 and can be decreased to the order of $\mu$m, and the area of the extraction electrodes 4 facing to the conductive layer 3 can be sufficiently increased. A thermally sensitive element 1 having a high temperature dependency, in other words, having a high thermistor constant of 100 to 3,500 K, can be thereby achieved. In particular, the aramid film used in the above embodiment advantageously exhibits remarkable dimensional shrinkage in the thickness direction by carbonization as compared with other resins.

Figure 6:
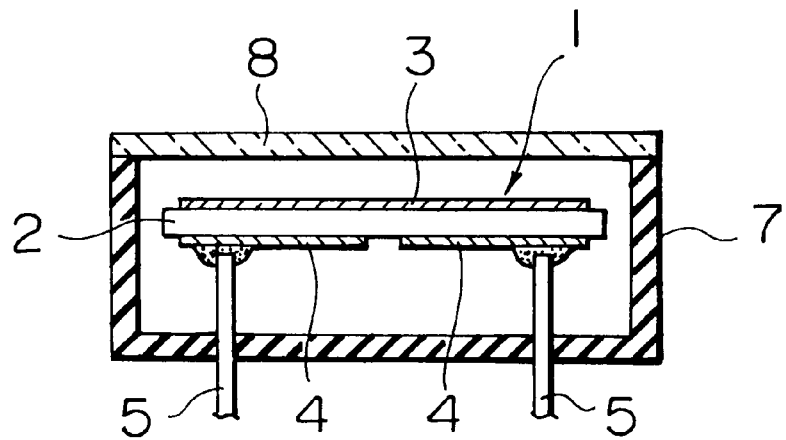
FIG. 6 is a sectional view of a radiation sensor incorporated in an embodiment.

FIG. 6 is a sectional diagram of a radiation sensor incorporated in an embodiment. The radiation sensor is mainly composed of: an insulating case 7 made of a light-shading synthetic resin, etc.; a window 8 set up at an upper open end of the insulating case 7; and the above-mentioned thermally sensitive element 1 positioned in the insulating case 7. A pair of terminals 5 are led outside from the bottom of the insulating case 7. The terminals 5 are fixed to the corresponding extraction electrodes 4 using a conductive adhesive at the time of packaging the thermally sensitive element 1 into the insulating case 7. However, the terminals 5 may be fixed to the extraction electrodes 4 before packaging the thermally sensitive element 1, if the terminals 5 are led outside from a junctional plane of the insulating case 7 and the window 8. The window 8 is made of a material having a high infrared transmittance, such as polyethylene, polycarbonate, silicone, germanium, or calcium fluoride, and may be formed into a convex-lens shape to serve as a converging lens, if required. In the thermally sensitive element 1, the conductive layer 3 and the window 8 are positioned opposite to each other. When the surface of the thermally sensitive element 1 receives infrared rays through the window 8, the resistance of the thermally sensitive element 1 is altered by the infrared radiation. The changes in the resistance (in practice, the voltage) of the thermally sensitive element 1 is detected from the electrodes 5. In the above radiation sensor, the conductive layer 3 serves as an infrared-receiving face. Thus, carbon ink having the highest heat-absorbing efficiency among the above-mentioned materials is preferably employed as a material for the conductive layer 3. In particular, the carbon ink is preferably prepared as follows: carbon fillers such as graphite, carbon black, carbon fibers, or carbon beads are dispersed in a binder such as a thermosetting resin including a phenol resin and an epoxy resin, or a thermoplastic resin including a saturated polyester resin. Meanwhile, as a material for the extraction electrodes 4 on which infrared rays are not radiated, a metal such as gold, silver, copper, nickel, or aluminum is preferably used among the above-described materials, after considering the connection strength of the terminals 5.

Figure 7:
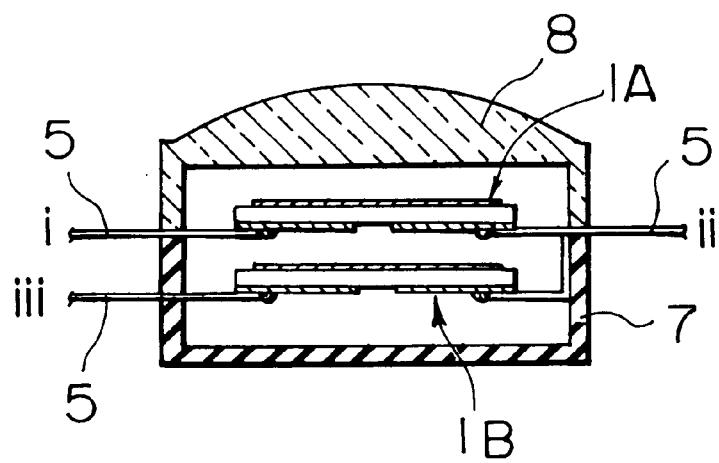
FIG. 7 is a sectional view of a radiation sensor incorporated in another embodiment.
Figure 8:
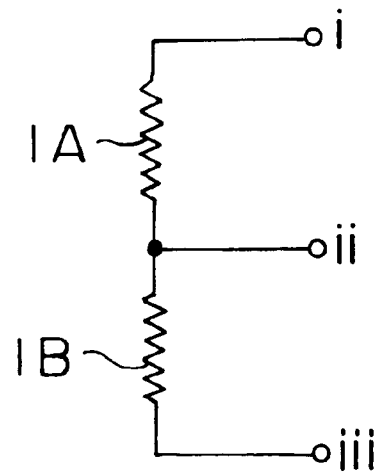
FIG. 8 shows a circuit of the radiation sensor of FIG. 7.

In a radiation sensor shown in FIG. 7, a pair of thermally sensitive elements 1A and 1B are arranged such that the thermally sensitive element 1A is located above the thermally sensitive element 1B inside an insulating case 7 having a window 8, and they are serially connected. Three terminals 5 are led from the thermally sensitive elements to the outside. When the three terminals 5 are referred to as 5-i, 5-ii, and 5-iii, respectively, the thermally sensitive elements 1A and 1B are serially connected between the terminals 5-i and 5-iii, and the intermediate electric potential is checked using the terminal 5-ii, as is shown in FIG. 8. The thermally sensitive element 1A and 1B are the same type as the above thermally sensitive element 1 and they have the same temperature dependency. Since the upper thermally sensitive element 1A is used for sensing radiation, infrared rays are radiated from the outside on a conductive layer 3 thereof. Meanwhile, the lower thermally sensitive element 1B is allowed to avoid infrared radiation because it serves to compensate for the temperature.

Therefore, a voltage output from the terminal 5-ii is not altered (V=0) by the ambient-temperature change when a constant voltage is applied between the terminals 5-i to 5-iii in the circuit shown in FIG. 8, because the thermally sensitive elements 1A and 1B have the same temperature dependency so that they have the same change rate of the resistance. In other words, the resistance change of the thermally sensitive element 1A and that of the thermally sensitive element 1B due to the ambient-temperature can be canceled according to the above structure. Moreover, the radiation sensor can detect the infrared radiation as follows: when infrared rays are radiated on the surface of the thermally sensitive element 1A through the window 8, the resistance of the thermally sensitive element 1A is reduced by the infrared radiation and the voltage detected from the terminal 5-ii alters corresponding to the resistance change.

Figure 9:
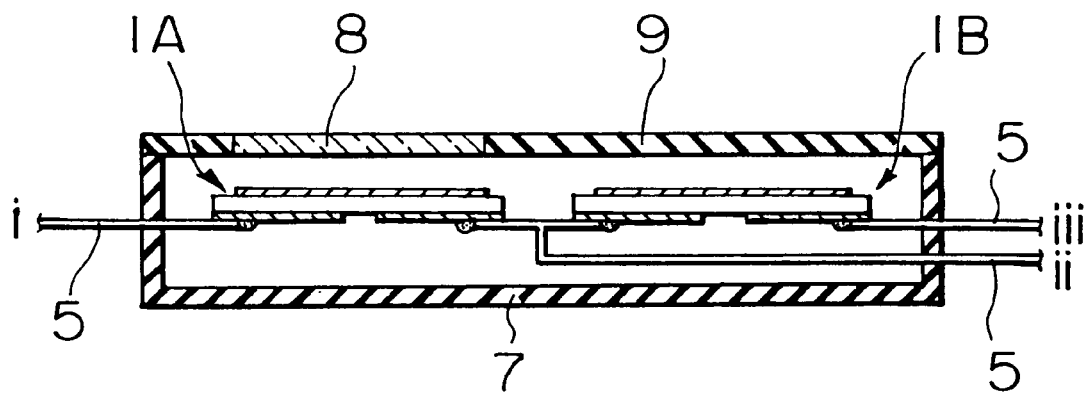
FIG. 9 is a sectional view of a radiation sensor incorporated in another embodiment.

The radiation sensor shown in FIG. 9 has basically the same structure according to the same detection theory as that of the radiation sensor shown in FIG. 7, except for the following structure: a window 8 is formed in a shading lid 9 fixed at the upper opening end of an insulating case 7, a thermally sensitive element 1A for sensing radiation and another thermally sensitive element 1B for temperature compensation are juxtaposed inside the insulating case 7 such that only a conductive layer 3 of the thermally sensitive element 1A receives infrared rays coming from the outside through the window 8.

Figure 10:
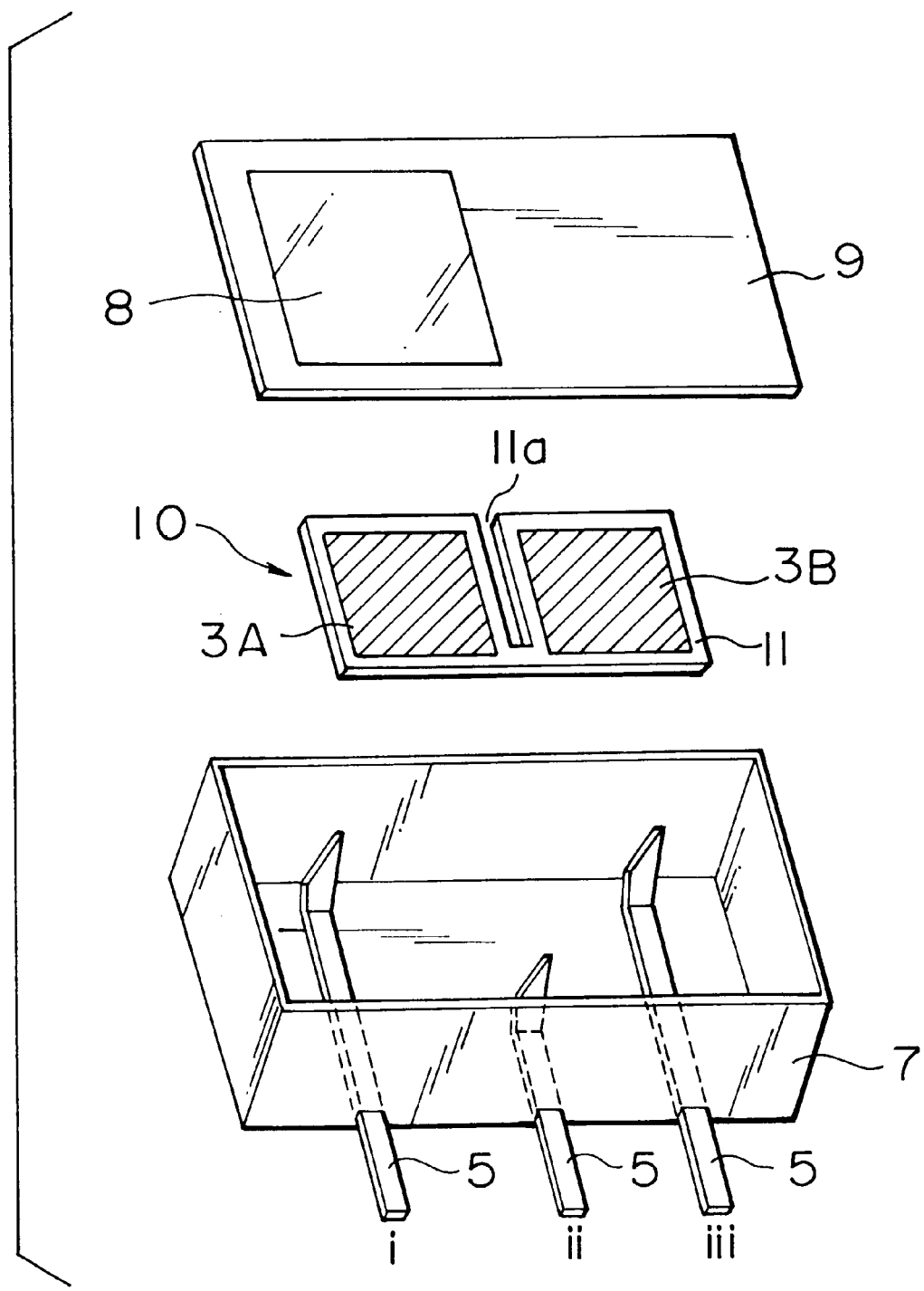
FIG. 10 is a perspective sectional exploded view of a radiation sensor incorporated in another embodiment.

A radiation sensor shown in FIG. 10 has a thermally sensitive element 10 which serves for both sensing radiation and compensating for the temperature. The thermally sensitive element 10 is manufactured according to the same method as that for the above mentioned thermally sensitive element 1 and has a plate 11 prepared by carbonizing an aramid film (base film). A deep notch 11a dividing the plate 11 into two parts is formed in the center portion of the plate 11 before carbonization. A conductive layer 3A for sensing radiation and another conductive layer 3B for temperature compensation are formed on the surface of the corresponding parts of the plate 11 divided by the notch 11a. As is shown in FIGS. 11 and 12, two pairs of extraction electrodes 4A and 4B corresponding to the conductive layers 3A and 3B are formed on the reverse surface of the plate 11. One pair of extraction electrodes 4A and 4B are connected by a wiring pattern 12.

The thermally sensitive element 10 is positioned inside an insulating case 7 having a lid 9. Three terminals 5 are insert-molded into the insulating case 7. One extraction electrode of the pair of extraction electrodes 4A and 4B connected by the wiring pattern 12 and the other pair of extraction electrodes 4A and 4B are fixed to the corresponding terminals 5 using a conductive adhesive. Infrared rays coming from the outside are radiated only on the conductive layer 3A through a window 8 formed in the lid 9 and are not allowed to reach the conductive layer 3B. Therefore, in the thermally sensitive element 10, a thermally sensitive element section for sensing radiation is formed by the conductive layer 3A and the extraction electrodes 4A opposed to the conductive layer 3A with the plate 11 therebetween, and a thermally sensitive element section for temperature compensation is formed by the conductive layer 3B and the extraction electrodes 4B opposed to the conductive layer 3B with the plate 11 therebetween. As a result, the thermally sensitive element 10 operates in accordance with the same theory as that of radiation sensor shown in FIG. 9.

According to a radiation sensor having the above structure, one plate 11 made of a carbonized material has both a thermally sensitive element section for sensing radiation and a thermally sensitive element section for temperature compensation. Thus, no selection procedure is required for matching the temperature dependency of these two types of thermally sensitive element sections, thereby improving efficiency of the procedure. In addition, the extraction electrodes 4A and 4B of the thermally sensitive element section for sensing radiation and the thermally sensitive element section for temperature compensation can be connected by the wiring pattern 12 on the plate 11, resulting in improved efficiency of the connecting procedure. Moreover, since the radiation-sensing conductive layer 3A and the temperature-compensating conductive layer 3B are provided on the corresponding parts divided by a deep notch 11a formed in the plate 11, the radiant heat absorbed in the conductive layer 3A is outgoingly radiated from the deep notch 11a. Temperature elevation due to heat-conduction to the thermally sensitive element section for temperature compensation can be thereby suppressed.

Figure 13:
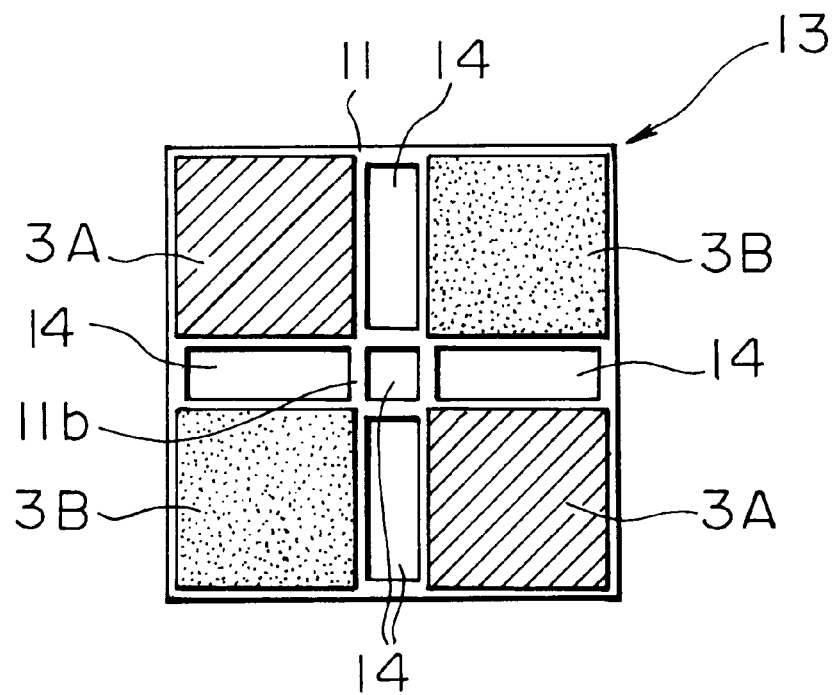
FIG. 13 is a top view of a thermally sensitive element incorporated in another embodiment.
Figure 14:
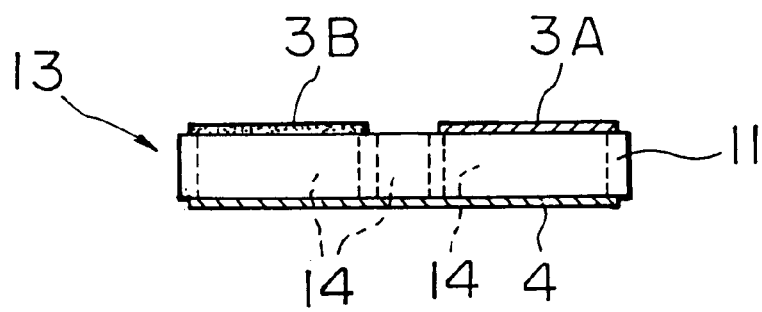
FIG. 14 is a front view of the thermally sensitive element shown in FIG. 13.
Figure 15:
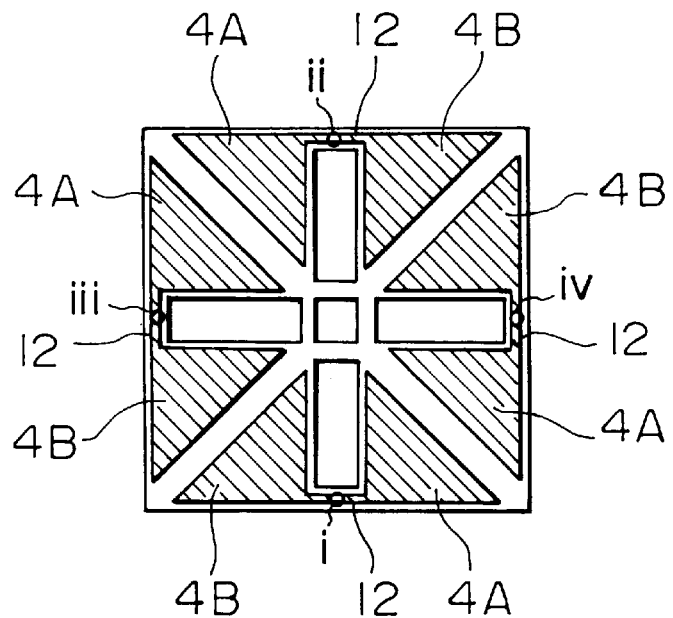
FIG. 15 shows the reverse side the thermally sensitive element shown in FIG. 13.

FIGS. 13 to 15 show a thermally sensitive element 13 which is a modification of the thermally sensitive element 10. A regular-square plate 11 is made of a carbonized material and has slits 14 punched in a cross-shape before carbonization. The surface of the plate 11 is divided into four regions by the slits 14. Two conductive layers 3A for sensing radiation and two conductive layers 3B for temperature compensation are formed on the corresponding surface regions such that the conductive layer 3A and the conductive layer 3B are adjacent to each other. Carbon ink having a high heat-absorbing efficiency is preferably used for the conductive layer 3A, and meanwhile, a thin metallic film having a high heat reflectance is preferably used for the conductive layer 3B. The slits 14 serve a function similar to the deep notch 11a. Although crosspieces 11b for reinforcement are provided around the center hole in this embodiment, they may be omitted. Meanwhile, on the reverse surface of the plate 11, four pairs of extraction electrodes 4A and 4B are formed corresponding to the conductive layers 3A and 3B. The extraction electrodes 4A and 4B of each pair are connected to each other by a wiring pattern 12.

Figure 16:
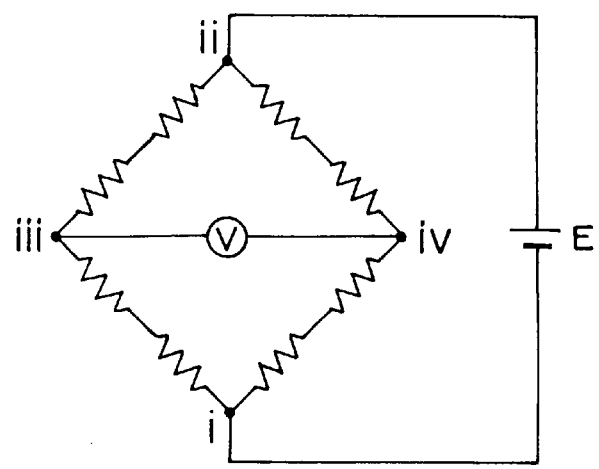
FIG. 16 shows a circuit of a radiation sensor employing the thermally sensitive element shown in FIG. 13.

The thermally sensitive element 13 is positioned inside an insulating case (not shown in the figure) having a lid, as is similar to the above-mentioned embodiments. For using the thermally sensitive element 13 in a radiation sensor, terminals i to iv are connected to the corresponding wiring patterns 12 so as to form a bridge circuit, as is shown in FIG. 16. Therefore, when a constant voltage E is applied between the terminals i and ii in the bridge circuit shown in FIG. 16, an output voltage V between the terminals iii and iv does not alter (V=0) due to the changes in the ambient temperature because the four thermally sensitive element sections formed on the same plate 11 have the same change rate of resistance. In other words, the resistance change of the thermally sensitive element 13 due to the ambient-temperature can be canceled according to the above structure. Moreover, the radiation sensor can detect the infrared radiation as follows: when infrared rays are radiated on the conductive layer 3A, the resistance of the thermally sensitive element section for sensing radiation is reduced by the infrared radiation and the voltage between the terminals iii and iv alters corresponding to the resistance change.

The present invention has the following advantages:

When a carbonized sheet material having a high specific resistance is used for a thermally sensitive element, a plurality of extraction electrodes are formed on one surface of the carbonized sheet material, and a conductive layer is provided on the reverse surface of the carbonized sheet material, the resistance between the extraction electrodes being almost the same as twice of the thickness-direction resistance of the carbonized sheet material. Therefore, the operating resistance can be set in a general range, i. e., from several kΩ to several hundreds kΩ. A thermally sensitive element having a high temperature dependency can be thereby achieved, despite the use of a carbonized sheet material having a high specific resistance. Furthermore, in a radiation sensor having such a thermally sensitive element, the portion having the conductive layer can be used as a radiation sensitive face. Since no extraction electrode is formed on this radiation sensitive face, the heat capacitance of the thermally sensitive element can be lowered, thereby advantageously raising the response rate.

Moreover, a radiation sensor of the present invention has at least two thermally sensitive elements whose extraction electrodes are serially connected. One thermally sensitive element is used for sensing radiation and the other is employed for temperature compensation. According to a radiation sensor having the above structure, it becomes easier to match the temperature dependency of the thermally sensitive element for sensing radiation and that of the thermally sensitive element for temperature compensation. Thus, when radiant rays coming from the outside are allowed to reach only the conductive layer of the thermally sensitive element used for sensing radiation, resistance changes due to the ambient temperature can be canceled by the thermally sensitive element for temperature compensation.

A radiation sensor of the present invention comprises a thermally sensitive element in which a carbonized sheet material is composed of a base film. The base film has a radiation-sensing conductive layer and a temperature-compensating conductive layer. Extraction electrodes opposite to these conductive layers are serially connected. According to the radiation sensor having the above structure, the thermally sensitive element section for sensing radiation and thermally sensitive element section for temperature compensation are formed on one base film, and thus no selection procedure is required for matching the temperature dependency of these thermally sensitive element sections, resulting in improved efficiency of the procedure. In addition, the extraction electrodes of the thermally sensitive element section for sensing radiation and thermally sensitive element section for temperature compensation can be connected to each other by a wiring pattern on the base film. Thus, efficiency of the connecting procedure can be further improved.

Furthermore, when a cut-out section is made in the base film, and the radiation-sensitive conductive layer and the temperature-compensating conductive layer are alternately formed in a plurality of regions divided by the cut-out section, the radiant heat absorbed in the radiation-sensitive conductive layer is outgoingly radiated from the cut-out section. Temperature elevation due to heat conduction to the thermally sensitive element section for temperature compensation can be thereby suppressed.

Even when the radiant rays from the outside are radiated on both radiation-sensing conductive layer and the temperature-compensating conductive layer in a radiation sensor employing a thermally sensitive element for sensing radiation and a thermally sensitive element for temperature compensation, temperature elevation of the thermally sensitive element for temperature compensation can be suppressed by using a material having a high radiation absorbance, such as carbon ink, as the radiation-sensing conductive layer and employing a metallic thin-film having significantly high infrared reflectance as the temperature-compensating conductive layer.

What is claimed is:

1. A thermally sensitive element comprising:
   a carbonized sheet material prepared by carbonizing an organic material;
   a plurality of extraction electrodes formed on a first surface of said carbonized sheet material; and
   a conductive layer having a specific resistance lower than that of said carbonized sheet material and formed on a second surface of said carbonized sheet material, said second surface being opposite of said first surface.

2. A thermally sensitive element as set forth in claim 1, wherein said organic material is an aramid film.

3. A radiation sensor in an ambient environment, said radiation sensor comprising said thermally sensitive element as set forth in claim 1, wherein radiant rays in said ambient environment are radiated on said conductive layer.

4. A radiation sensor as set forth in claim 3, wherein said conductive layer comprises a conductive material containing carbon.

5. A radiation sensor comprising at least two thermally sensitive elements as set forth in claim 1, wherein said extraction electrodes formed on said thermally sensitive elements are serially connected, one of said thermally sensitive elements is used for sensing radiation and the other thermally sensitive element is employed for temperature compensation.

6. A radiation sensor as set forth in claim 5, wherein said carbonized sheet materials of said at least two thermally sensitive elements are formed by carbonizing a single base film, extraction electrodes for said carbonized sheet materials are formed on a first surface of said base film, and said conductive layers are formed on a second surface of said base film, said second surface of said base film being opposite said first surface of said base film.

7. A radiation sensor as set forth in claim 6, wherein said extraction electrodes are connected on said base film.

8. A radiation sensor as set forth in claim 7, wherein a cut-out section is formed in said base film, and said conductive layers used for sensing radiation and temperature compensation, respectively, are formed on a plurality of regions, divided by said cut-out section, such that said conductive layer used for sensing radiation and said conductive layer used for temperature compensation are adjacent to each other.

9. A radiation sensor as set forth in claim 6, wherein a cut-out section is formed in said base film, and said conductive layers used for sensing radiation and temperature compensation, respectively, are formed on a plurality of regions, divided by said cut-out section, such that said conductive layer used for sensing radiation and said conductive layer used for temperature compensation are adjacent to each other.

10. A radiation sensor as set forth in claim 6, wherein the radiant-ray absorbance of said conductive layer used for sensing radiation is higher than that of said conductive layer used for temperature compensation.

* * * * *